US008738964B2

(12) United States Patent
Markus

(10) Patent No.: US 8,738,964 B2
(45) Date of Patent: May 27, 2014

(54) DISK-FREE RECOVERY OF XA TRANSACTIONS FOR IN-MEMORY DATA GRIDS

(75) Inventor: Mircea Markus, London (GB)

(73) Assignee: Red Hat, Inc., Raleigh, NC (US)

( * ) Notice: Subject to any disclaimer, the term of this patent is extended or adjusted under 35 U.S.C. 154(b) by 337 days.

(21) Appl. No.: 13/324,196

(22) Filed: Dec. 13, 2011

(65) Prior Publication Data

US 2013/0151889 A1  Jun. 13, 2013

(51) Int. Cl.
*G06F 11/00* (2006.01)
(52) U.S. Cl.
USPC ............................................................ 714/20
(58) Field of Classification Search
CPC .................................................. G06F 11/0706
USPC ................................................................ 714/20
See application file for complete search history.

(56) References Cited

U.S. PATENT DOCUMENTS

| | | | |
|---|---|---|---|
| 7,096,343 B1 * | 8/2006 | Berenbaum et al. | 712/24 |
| 2008/0294615 A1 * | 11/2008 | Furuya et al. | 707/4 |
| 2009/0287703 A1 * | 11/2009 | Furuya | 707/8 |
| 2010/0146396 A1 * | 6/2010 | Able et al. | 715/735 |
| 2012/0144404 A1 * | 6/2012 | Cipresso et al. | 719/314 |
| 2013/0212336 A1 * | 8/2013 | Nayyar et al. | 711/141 |
| 2013/0238576 A1 * | 9/2013 | Binkert et al. | 707/695 |

* cited by examiner

*Primary Examiner* — Bryce Bonzo
(74) *Attorney, Agent, or Firm* — Lowenstein Sandler LLP

(57) ABSTRACT

A data grid node that is hosted by a computing system receives a request to prepare transaction operations for a multi-operational transaction for a commit. The transaction operations are associated with other data grid nodes in the data grid. The data grid node stores transaction state data for the multi-operational transaction in local memory associated with the data grid node and identifies other data grid nodes in the data grid that manage the data pertaining to the transaction operations for the multi-operational transaction. The data grid node sends the transaction state data to the other data grid nodes and the other data grid nodes store the transaction state data in local memory associated with the corresponding data grid node.

20 Claims, 10 Drawing Sheets

DISK-FREE RECOVERY OF XA TRANSACTIONS FOR IN-MEMORY DATA GRIDS

TECHNICAL FIELD

Embodiments of the present invention relate to recovering data for XA transactions, and more specifically to disk-free recovery of XA transactions for in-memory data grids.

BACKGROUND

Cloud computing is a model for enabling on-demand network access to a shared pool of configurable computing resources (e.g., networks, servers, storage, applications, and services) that can be rapidly provisioned and released with minimal management effort or service provider interaction. Cloud computing providers may offer infrastructure as a service (IaaS) and platform as a service (PaaS). One service that has been challenging to move to the cloud computing model is managed data storage, which is conventionally performed by databases. Data storage is stateful, which makes data as a service (DaaS) more challenging than other categories of cloud computing. Traditional data storage uses databases such as structured query language (SQL) and not only SQL (NoSQL) databases. Databases support the XA (X/Open XA) architecture and XA transactions, which are transactions that consist of multiple operations that access resources. For example, a banking application may conduct an XA transaction that consists of two operations (1) deduct money from a first bank account and (2) add the deducted money to a second bank account. Typically, either both of the operations relating to the XA transaction will be permanent, if successful, or none of them will occur, and the data in an in-memory data grid relating to the bank accounts can be rolled back to a previous state as if the transaction never occurred.

In traditional data storage systems, such as databases, consistency is usually achieved by logging information to disk. If a process fails after a transaction is prepared and before it is completed, then a recovery log is read in order to move the system into a consistent state. The conventional disk-based recovery-log approach is costly because it involves a disk write.

Traditional database data storage usually does not work for DaaS because databases do not scale. Databases tend to run on a single machine or a few machines running in a fixed cluster. Therefore, databases typically are not distributed by nature. This becomes a problem in the cloud because there is no guarantee in a cloud environment that a particular server will be available at any given time. The lack of distribution for databases hampers elasticity and high availability, two of the parameters for cloud computing services.

Distributed databases, also known as data grids and in-memory data grids, have been recognized as a better alternative to databases in clouds. Data grids can scale up to thousands of nodes. Data grid platforms also improve the scalability of non-cloud applications by removing database bottlenecks and single points of failure. Some data grids may support XA transactions, but not recovery of transaction state data in case the state data is lost.

BRIEF DESCRIPTION OF THE DRAWINGS

The present invention is illustrated by way of example, and not by way of limitation, in the figures of the accompanying drawings and in which.

DETAILED DESCRIPTION

Described herein are a method and apparatus for providing disk-free recovery of XA (X/Open XA) transactions for in-memory data grids. In one embodiment, a data grid node that is hosted by a computing system receives a request to prepare transaction operations for a multi-operational transaction for a commit. The transaction operations are associated with other data grid nodes in the data grid. The data grid node stores transaction state data for the multi-operational transaction from the request in local memory that is coupled to the data grid node and identifies other data grid nodes in the data grid that manage the data pertaining to the transaction operations for the multi-operational transaction. The data grid node sends the transaction state data to the other data grid nodes and the other data grid nodes store the transaction state data in local memory that is coupled to the corresponding data grid node.

Embodiments of the present invention reduce costs to recover data and provide fast recovery of transaction state data by redundantly storing the transaction state data in-memory for a multi-operational transaction at multiple data grid nodes in an in-memory data grid.

Figure 1:
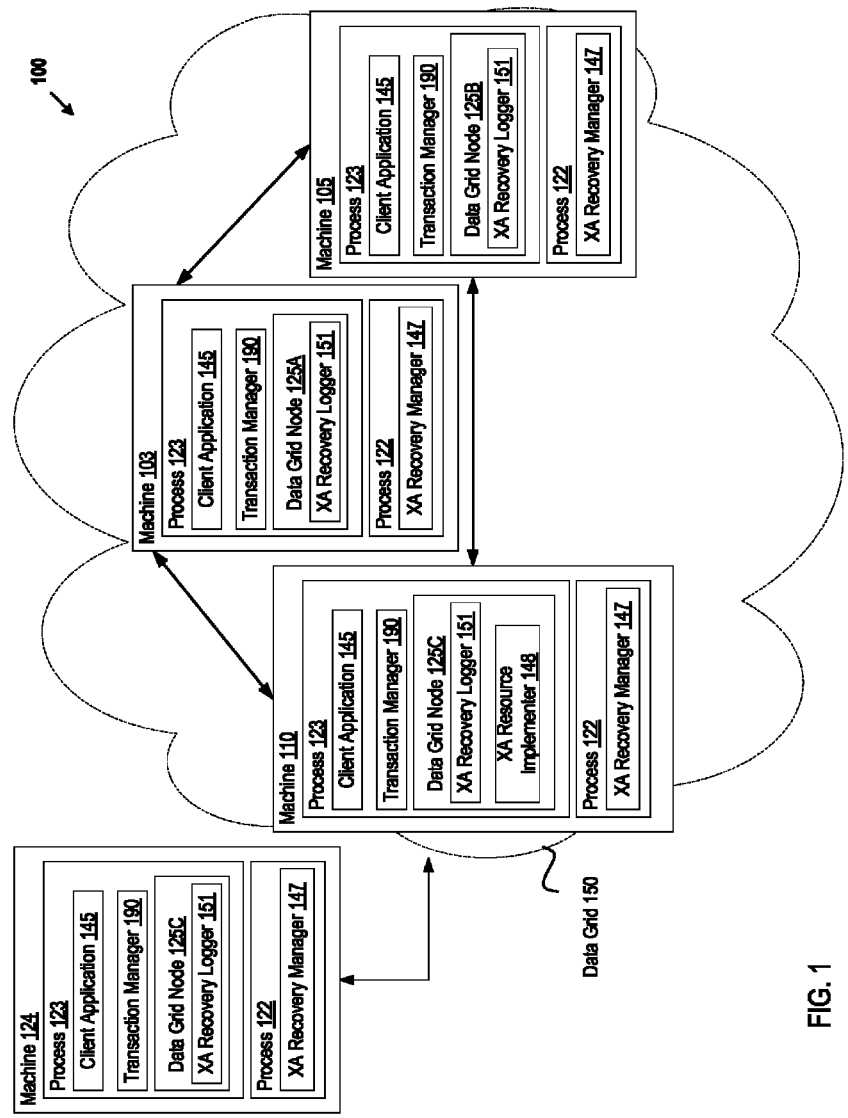
FIG. 1 is an exemplary network architecture in which embodiments may operate.

FIG. 1 is an exemplary network architecture 100 in which embodiments of the present invention can be implemented. The network architecture 100 can include multiple machines 103, 105, 110, 124 connected via a network (not shown). The network may be a public network (e.g., Internet), a private network (e.g., a local area network (LAN)), or a combination thereof.

Machines 103, 105, 110, 124 may be hardware machines such as desktop computers, laptop computers, servers, or other computing devices. Each of the machines 103, 105, 110, 124 may include an operating system that manages an allocation of resources of the computing device (e.g., by allocating memory, prioritizing system requests, controlling input and output devices, managing file systems, facilitating networking, etc.). In one embodiment, one or more of the machines 103, 105, 110, 124 is a virtual machine. For example, one or more of the machines may be a virtual machine provided by a cloud provider. In some instances, some machines may be virtual machines running on the same computing device (e.g., sharing the same underlying hardware resources). In one embodiment, one or more of the machines 103, 105, 110 is a Java Virtual Machine (JVM), which may run on a hardware machine or on another virtual machine.

Machines 103, 105, 110 each include a data grid node 125A-C that runs on the machine. The data grid node 125A-C is an instance of a data grid application. Each data grid node 125A-C may act as a server to clients and as a peer to other data grid nodes 125A-C. The data grid nodes 125A-C may communicate via the network to form an in-memory data grid 150. This may include using peer-to-peer protocols to establish and manage membership of the in-memory data grid 150.

The in-memory data grid 150 is a data store that spans multiple machines 103, 105, 110 that are joined in a distributed cluster. A distributed cluster enables the in-memory data grid 150 to scale linearly as more data grid nodes 125A-C are added to the cluster. In one embodiment, distribution makes use of a consistent hash algorithm to determine where in the cluster entries should be stored. The hashing algorithm may be configured to maintain a specified number of copies of each entry in the in-memory data grid 150. In one embodiment, the hashing algorithm is deterministic in locating entries without resorting to multicasting requests or maintaining expensive metadata. In one embodiment, the in-memory data grid 150 is a NoSQL based data store. The in-memory data grid 150 can be provided to clients using a DaaS model. An in-memory data grid 150 may rely on main memory for data storage. In-memory data grids 150 are faster than disk-optimized data grids since they execute fewer CPU instructions. For brevity and simplicity, an in-memory data grid 150 is used as an example of a data grid throughout this document.

The in-memory data grid 150 may include a volatile in-memory data structure such as a distributed cache. A data grid may also provide a persistent data structure (e.g., a data structure stored in non-volatile disk storage). In one embodiment, the in-memory data grid 150 provides a distributed cache with write through or write behind to persistent storage. In one embodiment, a key value based storage system is used to host the data for the in-memory data grid 150 as part of a cache store.

Unlike a database, the in-memory data grid 150 distributes stored data across multiple machines 103, 105, 110. The in-memory data grid 150 is elastic (can deal with new nodes being added and nodes being removed), scalable and highly available. The in-memory data grid 150 may also perform load balancing and failover of individual data grid nodes 125A-C. Therefore, the in-memory data grid 150 performs the functions normally provided by databases, but can provide these functions using a DaaS model.

In one embodiment, the in-memory data grid 150 operates in a client-server mode, in which the in-memory data grid 150 serves resources (e.g., a stateful data store such as a cache) to client applications 145. In one embodiment, a machine 124 is a client machine hosting one or more applications 145. An application 145 can be any type of application including, for example, a web application, a desktop application, a database management application, a browser application, etc. An application 145 can be hosted by one or more machines 124. In one embodiment, the in-memory data grid 150 acts as a shared storage tier for client applications 145. A separate memory space may be generated for each client application 145.

A data grid node 125A-D can include one or more processes 122,123. A process 122,123 is an operating system process (e.g., a Java virtual machine instance). In one embodiment, a client application 145 can run outside of the Java Virtual Machines of the data grid nodes 125A-C. In another embodiment, a client application 145 can run in the same Java Virtual Machine as a data grid node. One embodiment of a client application 145 running in the same virtual machine as a data grid node is described in greater detail below in conjunction with FIG. 6. In another embodiment, a client application 145 may not be a Java-based application and may not be executed by a Java Virtual Machine.

In one embodiment, the in-memory data grid 150 is indistinguishable from a database to users and client applications 145. Therefore, client applications 145 may use conventional database formats and protocols for communicating with the in-memory data grid 150.

Each data grid node 125A-C may act as a server for the data grid. Therefore, a client 160 may access any of the data grid nodes 125A-C to gain access to the entire data grid 150. New data grid nodes can be started and connected to the other data grid nodes without performing rehashing or state transfer.

In one embodiment, the in-memory data grid 150 provides a rich and powerful application programming interface (API) that looks and feels like a database. A client application 145 may communicate with any data grid node 125A-C of the in-memory data grid 150 to access data stored in the in-memory data grid 150. A data grid node 125A-C may receive database commands, such as commands to store objects, to retrieve objects, to perform searches, etc. When a data grid node 125A-D receives a command to store an object, the data grid node 125A-C divides the object into a collection of linked key value pairs. The data grid node 125A-C then stores some or all of these key value pairs. Additional data grid nodes 125A-C may also store some or all of the key value pairs. One embodiment of linking key value pairs is described in greater detail below in conjunction with FIG. 2. When any of the data grid nodes 125A-C receives a request for the stored object, that data grid node 125A-C gathers the key value pairs for that object, and reconstructs the object from the key value pairs. This may involve requesting the key value pairs from one or more other data grid nodes 125A-C. Once the object is reconstructed, the data grid node 125A-C returns the object to the client from which the request was received.

To use the in-memory data grid 150, a client application 145 acquires a session from the in-memory data grid 150, and sends commands to the in-memory data grid 150 as part of the session. Client application 145 may be a standalone application running on a single machine. A number of operations can be performed on the in-memory data grid 150. The data grid 150 can support multi-operational transactional access of the data grid nodes 125A-C. A multi-operational transaction can be an XA (X/Open XA) transaction. For brevity and simplicity, an XA transaction is used as an example of a multi-operational transaction throughout this document. In the XA architecture, an XA transaction is a distributed transaction that consists of multiple operations that access one or more resources. A data grid node A-C can provide operations for a multi-operational transaction, for example, start, prepare, commit, rollback, and recover operations, to perform multi-operational transactional access on the in-memory data grid 150. Performing operations that pertain to multi-operational transactional access on data in the in-memory data grid 150 may be performed by calling the get, put, remove, replace, start, prepare, commit, rollback, and recover functions on an instance of the in-memory data grid 150.

The operations that pertain to an XA transaction are considered to be within the scope of an XA transaction. Some multi-operational transactional standards, such as the XA standard, use a two-phase commit (2PC) protocol to ensure that all resources enlisted within a transaction either commit or rollback any particular transaction consistently (all of the resources do the same). An XA transaction should succeed or fail as a complete unit. If any of the operations within the scope of an XA transaction are not successful, none of the operations within the scope of the XA transaction are committed to an in-memory data grid 150.

For example, a banking application 145 may wish to conduct a transaction that consists of two access operations: (1) deduct money from a first bank account and (2) add the deducted money to a second bank account. The bank accounts can have data in one or more data grid nodes 125A-C in the in-memory data grid 150. For example, the data for the first bank account is stored in data grid node 125A and the data for the second bank account in stored in data grid node 125B. The operations may be requests to change the dollar amount in each bank account. The banking application 145 can make requests for transactional access of the in-memory data grid 150 via the transaction manager 190 and XA resource implementer 148 in a transaction originator node. One embodiment of an application request for an XA transaction using the transaction manager and XA resource implementer is described in greater detail below in conjunction with FIG. 6. There can be a data grid node, such as node 125C, that is designated as a transaction originator data grid node for a particular XA transaction. When a client application 145 communicates with the data grid 150 for a particular XA transaction, the client application 145 can directly communicate with transaction originator data grid node that is managing that particular transaction (e.g., transaction originator node 125C). The transaction originator data grid node can pass along an operation request to one or more data grid nodes 125A,B in the cluster.

Before the operation that deducts money from the first bank account is committed to data grid node 125A in the in-memory data grid 150, the transaction originator data grid node 125C can first ensure that the operation made to add money to the second bank account in data grid node 125B is successful. The transaction originator data grid node 125C can make sure that either all of the operations within the scope of transaction successfully happen or none of them occur. For instance, there may be a system failure or an operation failure pertaining to one of the data grid node 125A-C with regard to deducting money from the first bank account and/or adding money to the second bank account. In such a case, the banking application 145 may wish that the operations that deducted money from the first bank account and adding money to the second account, as well as any other operations performed within the scope of the transaction, rollback to a previous state.

When a process fails after an XA transaction is prepared and before the XA transaction is completed, the data in the data grid is in an inconsistent state. The data grid nodes 125A-C can include an XA recovery logger 151 and a recovery manager 147 to redundantly store the XA transaction state data for an XA transaction in the local in-memory container of multiple data grid nodes in the in-memory data grid. The XA recovery logger 151 and a recovery manager 147 components can be combined together or separated in further components, according to a particular embodiment. Examples of the XA transaction state data can include, and are not limited to, a key-value pair for each operation for the XA transaction, one or more cache names, an XA transaction identifier (XID) as provided by the XA compliant transaction manager 190 for the XA transaction, and an association between the XID and the operations. The XA recovery logger 151 and recovery manager 147 can backup the XA transaction state data for an XA transaction in memory of other data grid nodes 125A-C, such that if a data grid node 125A-C fails and is restarted, the XA recovery logger 151 of the failed node can recover the transaction state data from another node in the data grid.

An XA transaction that is prepared and not completed is also known as an in-doubt transaction. One embodiment of a system administrator process handling the state of the in-doubt transaction is described in greater detail below in conjunction with FIG. 9. The request can include the XA transaction identifier (XID) of an in-doubt transaction of interest. The system administrator process can use the XID to determine whether to force a commit or to force a rollback of the state of the transaction. A rollback command instructs the data grid nodes to cause any operation that was performed for a particular transaction to be returned to a previous state. A commit command instructs the data grid nodes to apply the change to allow other transactions that will read the data to read the changed data. The system administrator process can obtain an internal ID from a data grid node and can use the internal ID to execute a commit command or a rollback command.

Figure 2:
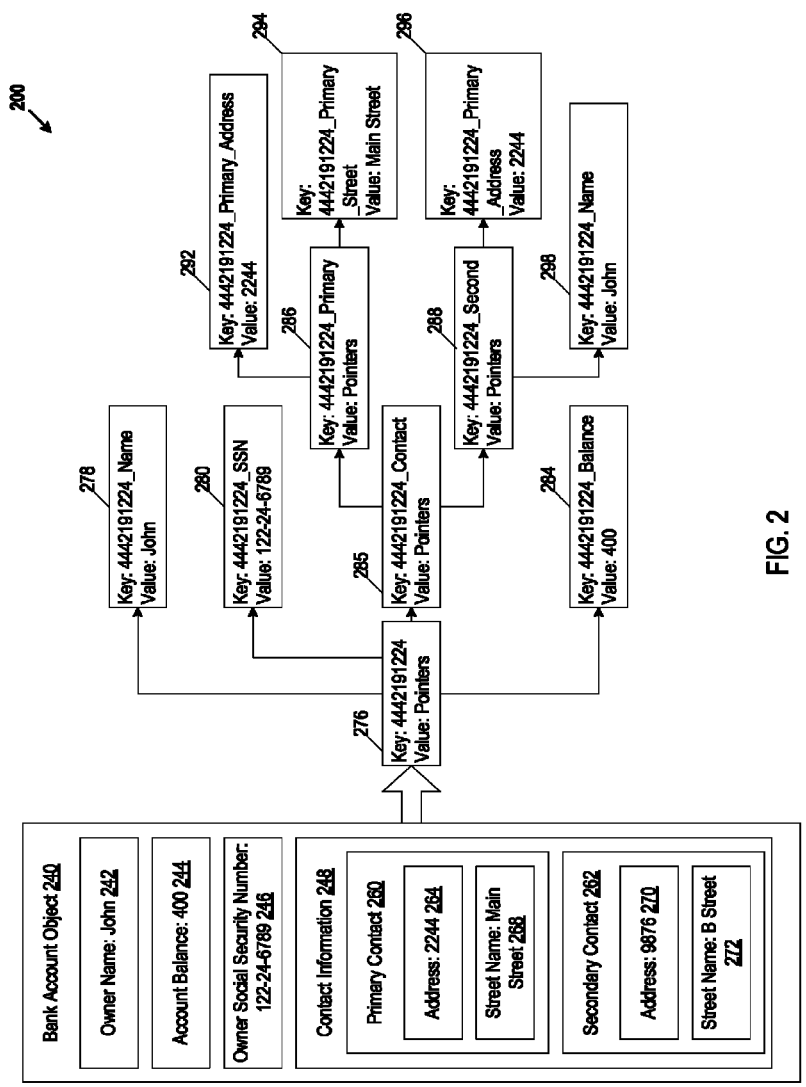
FIG. 2 illustrates an object and a collection of key value pairs generated from the object, in accordance with one embodiment of the present invention.

FIG. 2 illustrates an object 240 and a collection of key value pairs 200 generated from the object 240, in accordance with one embodiment of the present invention. An operation request, for example, from a transaction manager (e.g., XA compliant transaction manager 190 in FIG. 1) can include a key-value pair indicating the data that is to be operated on and a value for the operation and the data. The request can include a cache name. For example, the cache name may be "bank account" and can store a bank account object. As shown, the bank account object 240 includes the following fields: owner name 242, account balance 244, owner social security number (SSN) 246 and contact information 248. Fields 242, 244, 246 have primitive types. However, the contact information field 248 is a complex field for an internal object. The internal object has a primary contact field 260 and a secondary contact field 262, both of which are themselves complex fields for further internal objects. Primary contact field 260 includes an address field 264, and a street name field 268. Similarly, secondary contact field 262 includes an address field 270 and a street name field 272.

The collection of key value pairs 200 includes a primary key value pair 276. The primary key value pair 276 has a key of "4442191224" that represents an account number, which a data grid node can use to retrieve the primary key value pair 276. The primary key value pair's values are pointers to key value pairs 278, 280, 285, 284. Key value pairs 278, 280, 284 were generated from fields having primitive types. Therefore, the values of these key value pairs 278, 280, 284 are the contents of those fields.

Key value pair 285 was generated for an internal object (complex field 248). Therefore, key value pair 285 is a primary key value pair for the internal object. Key value pair 285 includes pointers to key value pairs 286, 288. Each of key value pairs 286, 268 is a primary key value pair for an additional nested object. Key value pair 286 includes pointers to key value pairs 292, 294. Key value pair 288 includes pointers to key value pairs 296, 298. Due to the pointers linking the key value pairs, a data grid node can retrieve all of the key value pairs and use them to reconstruct the object based on the unique identifier "4442191224."

Figure 3:
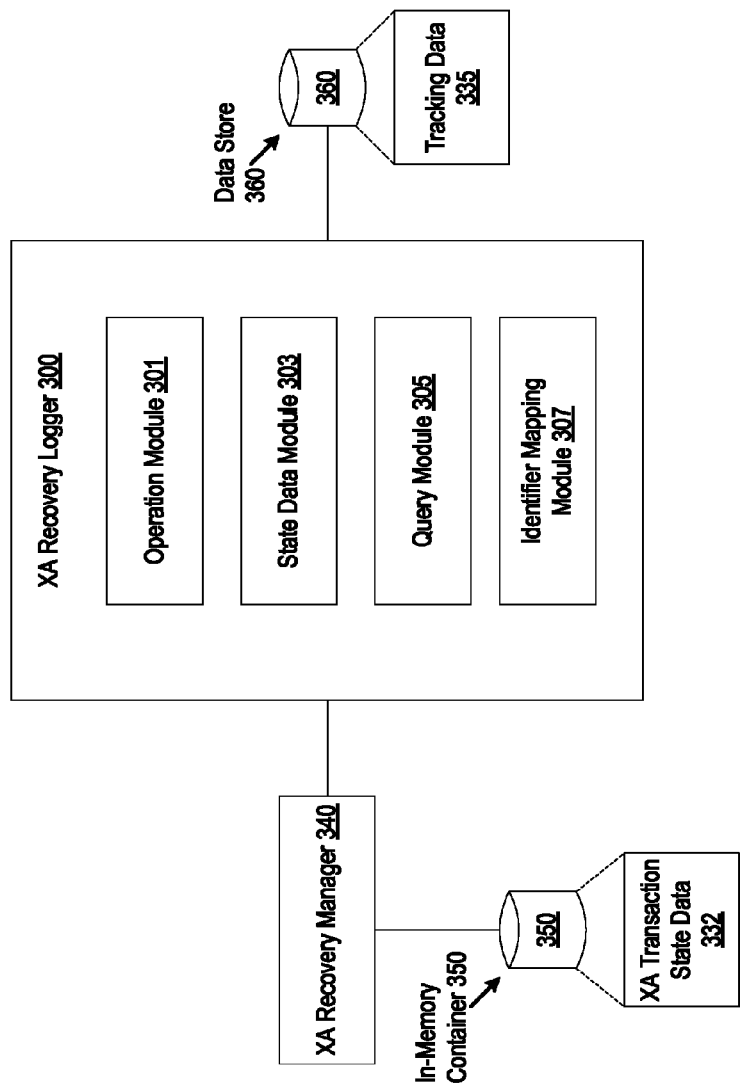
FIG. 3 illustrates a block diagram of one embodiment of an XA (X/Open XA) transaction state data module.

FIG. 3 illustrates a block diagram of one embodiment of an XA recovery logger 300. The XA recovery logger 300 may correspond to a XA recovery logger 151 in a data grid node 125A-C hosted by machine 103,105,110 of FIG. 1. In one embodiment, the XA recovery logger 300 includes an operation module 301, a state data module 303, a query module 305, and an identifier mapping module 307.

A data grid node that communicates with a transaction manager is a transaction originator node. An enlisted data grid node is a node in the data grid that manages data that relates to a transaction. Certain information for an XA transaction may be owned and managed by a particular node and other information for the XA transaction may be owned and managed by another node. For example, Owner Name data for an XA transaction may be owned by Node 2, and the Account Balance data for the XA transaction may be owned by Node 3. The transaction originator node can communicate with the enlisted data grid nodes in the data grid to manage the operations in the data grid pertaining to an XA transaction. For example, the transaction originator node is Node 1, and there are two enlisted data grid nodes in the data grid for the particular XA transaction, Node 2 and Node 3.

The operation module 301 can perform a requested operation (e.g., put, replace, prepare, rollback, commit) on the cache data that is coupled to the operation module 301. The operation-module 301 can receive a prepare request to prepare transaction operations for an XA transaction for a commit. A commit is to make a set of changes that were made to one or more caches for a particular XA transaction permanent. A prepare request can cause enlisted nodes that have performed operations relating to a particular XA transaction to take steps for ensuring that a future commit request will succeed. For example, an enlisted node can acquire a lock for any changed data. The prepare request can include the transaction state data for the XA transaction. Examples of the transaction state data can include, and are not limited to, a key-value pair for each operation for the XA transaction, one or more cache names, an XID for the multi-operational transaction, and an association between the XID and each operation.

When the XA recovery logger 300 is hosted by a transaction originator node, the prepare request which the operation module 301 receives may be from an XA compliant transaction manager (e.g., XA compliant transaction manager 190 in FIG. 1) via an XA resource implementer (e.g., XA resource implementer 148 in FIG. 1) that formats the request. The state data module 303 can send a record message to a recovery manager 340 (e.g., client 147 in FIG. 1) that is coupled to the state data module 303. The record state message is a request for the recovery manager 340 to write the transaction state data 332 in the local in-memory container 350 (e.g., main memory) for the data grid node. The record state message can include the transaction state data 332 for the XA transaction. The recovery manager 340 can receive a record state message and can write the transaction state data 332 in the local in-memory container 350 (e.g., main memory) for the data grid node. The recovery manager 340 can send a response to the state data module 303 indicating that the transaction state data 332 is stored in the local in-memory container 350, and the state data module 303 can store tracking data 335 in a data store 360 that is coupled to the state data module 303 to track the responses that are received.

When the XA transaction state data module 300 is hosted by a transaction originator node, the state data module 303 can use a cache name and a key that is specified in the prepare request to identify which nodes are the enlisted nodes that have cache data associated with cache name and the key. The state data module 303 can send a prepare request and a copy of the transaction state data 332 to the enlisted data grid nodes. The prepare request that is sent to the enlisted nodes is a request to prepare operations for an XA transaction for a commit and a request to store the transaction state data 332 for the XA transaction in the in-memory container of the corresponding enlisted node. The state data module 303 can wait to receive a response from each of the enlisted data grid nodes indicating that the corresponding enlisted data grid node has stored the transaction state data 332 for the XA transaction in its local in-memory container. The state data module 303 store tracking data 335 to track the responses that are received. When the state data module 303 receives a successful response from the enlisted nodes, the state data manager module 303 can send a response to the transaction manager indicating that the multi-operational transaction is ready for commit.

When the XA transaction state data module 300 is hosted by an enlisted data grid node, the prepare request which the operation module 301 receives may be from the state data module of a transaction originator node, and the operation module 301 can prepare the operations for a commit. For example, the operation module 301 can acquire a lock for the changed data. The state data module 303 sends a record message to the recovery manager 340 to write the transaction state data 332 in the local in-memory container 350 (e.g., main memory). The state data module 303 can receive a response from the recovery manager 340 indicating that the transaction state data 332 is stored in the local in-memory container 350 and can send a message to the transaction originator node that the transaction state data 332 for the XA transaction is stored in its local in-memory container 350.

A data grid node (e.g., transaction originator node, enlisted node) may fail. When a data grid node fails and its operating system is rebooted, the data grid node may receive a recover message from a recovery manager 340. The recover message is a request for any information which the failed data grid node may have pertaining to an in-doubt transaction. The query module 309 can broadcast a message to other data grid nodes in the cluster to request information for any in-doubt transactions. An embodiment of a failed data grid node broadcasting a request for information for in-doubt transactions is described in greater detail below in conjunction with FIG. 9. The query module 309 can receive information about an in-doubt transaction and can send a response to the XA compliant transaction manager.

When a data grid node is a node that receives the broadcast message requesting information for any in-doubt transactions, the query module 309 can send an in-doubt transaction request to the recovery manager 340 that is coupled to the query module 309. The in-doubt transaction request is a request for the recovery manager 340 to provide information about in-doubt transactions it is aware of. The recovery manager 340 can search the in-memory container 350 for information about in-doubt transactions and provide a response to the query module 309. An embodiment of the recovery manager 340 providing information about in-doubt transactions is described in greater detail below in conjunction with FIG. 9. The query module 309 can receive the response from the recovery manager 340 and can provide the information about the in-doubt transaction to the data grid node that sent out the broadcast message.

An identifier mapping module 313 can generate an internal identifier (internal ID) that corresponds to an XA transaction identifier (XID), which was provided by an XA compliant transaction manager (e.g., XA compliant transaction manager 194 in FIG. 1). The identifier mapping module 313 can create mapping information that maps the internal ID to an XID for an XA transaction. The internal ID can be used to communicate with data grid nodes to perform an operation, such as a commit operation and a rollback operation. An embodiment for using an internal ID is described in greater detail below in conjunction with FIG. 9.

Figure 4:
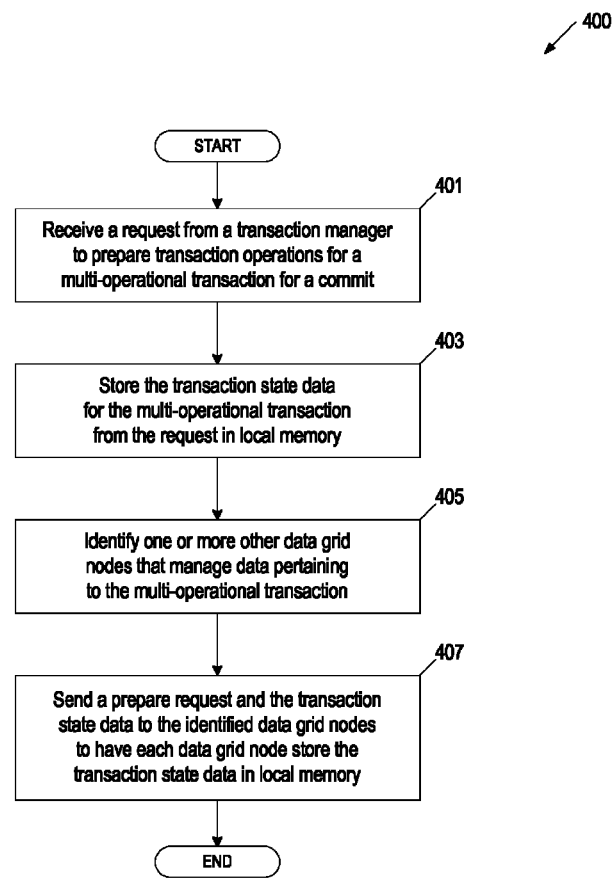
FIG. 4 is a flow diagram of an embodiment of a method for distributing transaction state data to nodes in a data grid to be stored redundantly in-memory in the data grid.

FIG. 4 is a flow diagram of an embodiment of a method 400 for a transaction originator node distributing transaction state data to nodes in a data grid to be stored redundantly in-memory in the data grid. Method 400 can be performed by processing logic that can comprise hardware (e.g., circuitry, dedicated logic, programmable logic, microcode, etc.), software (e.g., instructions run on a processing device), or a combination thereof. In one embodiment, method 400 is performed by an XA recovery logger 151 of a transaction originator node 125C hosted by a machine 110 of FIG. 1. At block 401, processing logic receives a prepare request from an XA compliant transaction manager to prepare transaction operations for an XA transaction for a commit. The prepare request can include the transaction state data for the XA transaction. At block 403, processing logic stores the transaction state data for the XA transaction in local memory that is coupled to the processing logic. At block 405, processing logic identifies one or more other data grid nodes in the cluster that own the data pertaining to the transaction operations for the XA transaction. Processing logic uses mapping data to determine which one or more nodes in the data grid to send the prepare operation request to. The nodes store mapping data of which caches are associated with which nodes. The prepare request can specify one or more cache names and one or more keys, and processing logic can use the mapping data to send the prepare operation request to the data grid nodes that contain a cache having the cache name and key. At block 407, processing logic sends a prepare request and the transaction state data to the one or more identified data grid nodes. The identified data grid nodes receive the transaction state data and store the transaction state data in local memory that is coupled to the corresponding data grid node.

Figure 5:
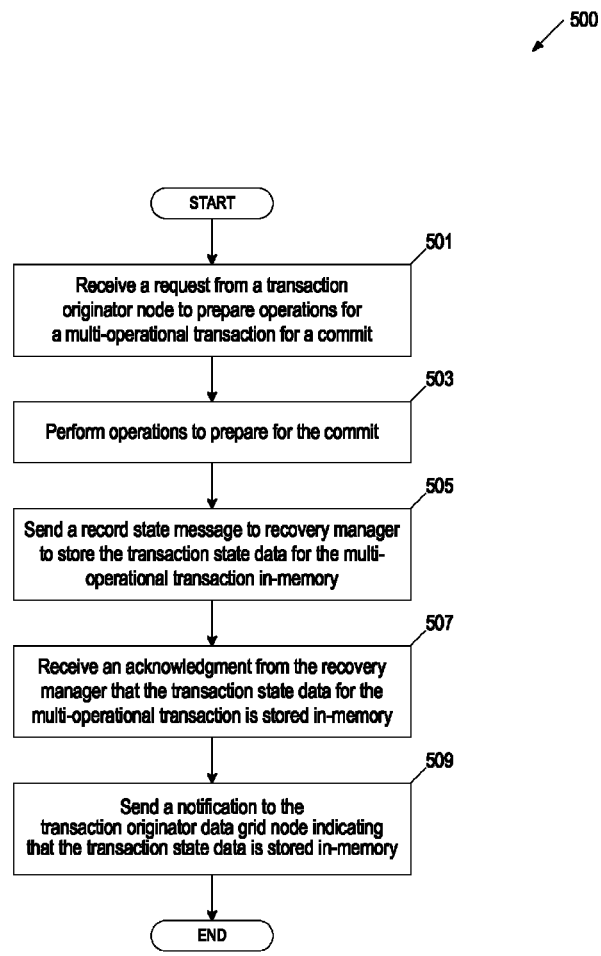
FIG. 5 is a flow diagram of an embodiment of a method of storing transaction state data for an XA transaction in local memory of a data grid node.

FIG. 5 is a flow diagram of an embodiment of a method 500 of an enlisted data grid node storing transaction state data for an XA transaction in local memory of a data grid node. Method 500 can be performed by processing logic that can comprise hardware (e.g., circuitry, dedicated logic, programmable logic, microcode, etc.), software (e.g., instructions run on a processing device), or a combination thereof. In one embodiment, method 500 is performed by an XA recovery logger 151 of an enlisted data grid node 125A,B hosted by a machine 103,105 of FIG. 1. At block 501, processing logic receives a prepare request from a transaction originator node to perform operations to prepare transaction operations of an XA transaction for a commit. At block 503, processing logic performs operations to prepare for the commit. For example, processing logic can acquire a lock for the changed data. At block 505, processing logic sends a record state message to a corresponding recovery manager to store the transaction state data for the XA transaction in local memory that is coupled to the data grid node. Processing logic can include the transaction state data in the record state message. A record state message can be a network call. A recovery manager receives a record state message and stores the transaction state data in memory that corresponds to the data grid node. At block 507, processing logic receives an acknowledgment from the recovery manager that the transaction state data is stored in-memory and sends a notification to the transaction originator data grid node indicating that the transaction state data is stored in the local memory at block 509.

Figure 6:
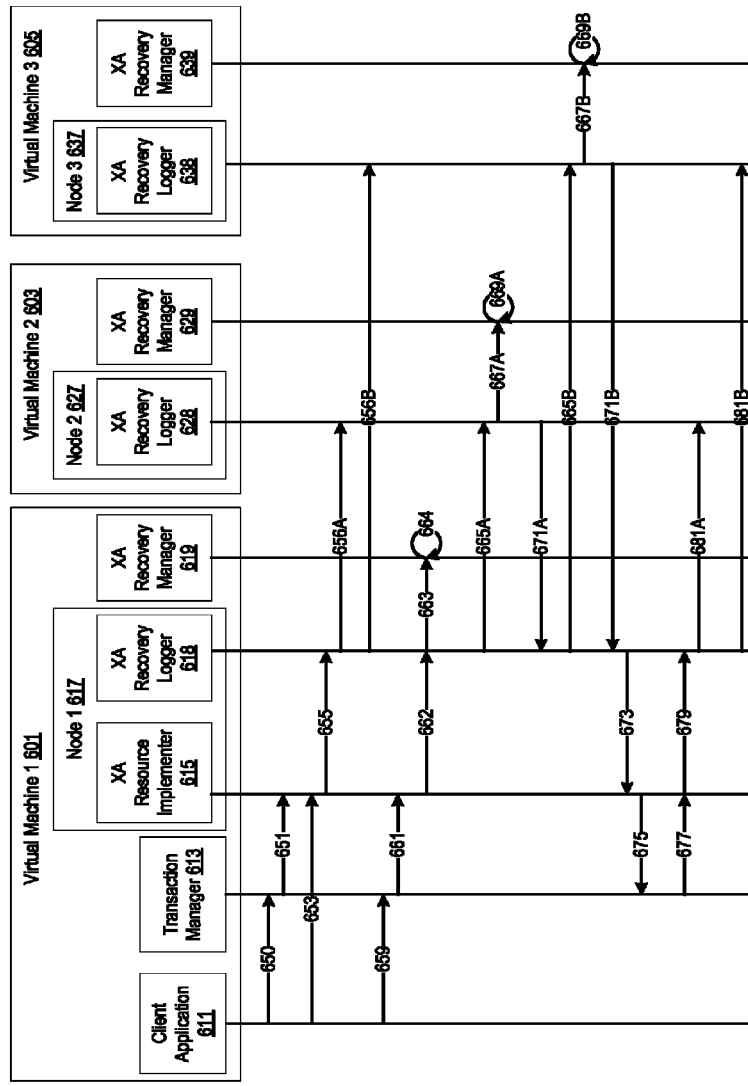
FIG. 6 is a block diagram of one embodiment of virtual machines storing transaction state data in-memory to provide disk-free recovery of XA transaction for in-memory data grids.

FIG. 6 is a block diagram of one embodiment of virtual machines storing transaction state data in-memory to provide disk-free recovery of XA transaction for in-memory data grids. A first virtual machine 601 can include a client application 611, a transaction manager 613, a data grid node 617, an XA resource implementer 615, and a recovery manager 619. As described above, a client application 611, a transaction manager 613, and a data grid node 617 may be included in a different virtual machine instance than an XA recovery manager 619. Alternatively, the XA recovery manager 619 may be in the same operating system process (e.g., Java virtual machine instance) as the client application 611, transaction manager 613, and data grid node 617. A second virtual machine 603 can include a data grid node 627. A third virtual machine 605 can include a data grid node 637. Each data grid node 617,627,637 includes an XA recovery logger 618,628, 638 that is co-located in the same operating system process as the respective data grid node.

A client application 611 can send (650) an XA compliant notification of the start of an XA transaction to a transaction manager 613. The transaction manager 613 can notify (651) the XA resource implementer 615 of the start of the XA transaction. The transaction originator node is the node where the client application 611 started the transaction. The transaction manager 613 can generate an XA compliant transaction identifier (XID) and provide the XID in the notification to the XA resource implementer 615, which can store the XID in a data store that is coupled to the XA resource implementer 615. The XA resource implementer 615 is notified it will associate all of the operations, for example, write a name Jane Doe in an Owner Name field and put a value of $0 in bank account 5552191234, for a current transaction.

The Node 1 617 can receive (653) a method call via an API from an application 611 requesting two operations to be performed on the data stored in the caches in the in-memory data grid for the XA transaction. For example, the first operation is to write a name Jane Doe in an Owner Name field and the second operation is to put a value of $0 in bank account 5552191234. In another example, the same transaction involving the two transactions (e.g., write Jane Doe, write value $0) is a distributed transaction that may involve interactions with other XA compliant resources (e.g., write an audit to a database). A distributed transaction is a transaction that spans more than one XA resource, such as a transactions that spans a data grid and a database.

Information for an XA transaction may be owned by a number of nodes 627,637 in the data grid other than the transaction originator node 617. For example, Owner Name data for a transaction may be owned by Node 2 627, and Account Balance data for the transaction may be owned by Node 3 637. In this example, the transaction originator node is Node 1 617, and there are two enlisted data grid nodes in the data grid for the particular XID, Node 2 627 and Node 3 637.

The nodes store mapping data of which caches are associated with which nodes. The data to node association is calculated using a consistent hashing algorithm to allow the transaction originator node 617 to identify the nodes that have cache data associated with a cache name. For example, Node 1 617 can use the data to node associations to determine that "Owner Data is owned by Node 2 627 and that "Account Balance" data is owned by Node 3 637. The Node 1 617 can send the operation requests to the appropriate nodes in the data grid that contain a cache having the cache name and key. For example, the transaction originator node 617 sends (656BA) the operation request to write a name 'Jane Doe' in an Owner Name field to Node 2 627 and sends (656B) the operation request to put a value of '$0' in bank account 5552191234 to Node 3 637. The nodes 627,637 can access the data to perform the operations accordingly. For instance, Node 2 627 will use the value "Jane Doe" to change the Owner Name data, and Node 3 937 will use the value "$0" to change the Account Balance data.

The client application 611 then sends (659) a message to the transaction manager 613 to commit the XA transaction. The commit message includes the XID for the XA transaction. The transaction manager 613 sends (661) a prepare message to transaction originator node 617 via the XA resource implementer 615 to initiate the two-phase commit protocol. The first phase is a prepare phase and the second phase is a commit phase. The prepare message instructs the transaction originator node 617 to prepare the XA transaction for a commit operation. Preparation can include, for example, and not limited to, one or more nodes in the data grid to acquire data locks for the particular data which the node is changing. The prepare message specifies the operations that are associated with XA transaction. The XA resource implementer 615 encodes the modifications performed in the transaction's scope (e.g, the account balance and owner data changes) into a proprietary format (e.g., Java serialization) and sends the formatted modifications to all of the nodes involved within the transaction (e.g., node 627, node 637). The XA resource implementer 615 also stores the formatted modifications in its own local memory via its own XA recovery logger.

The XA recovery logger 618 in the transaction originator node 617 sends (663) a record state message to its XA recovery manager 619. A record state message can be a network call. The recovery manager 619 receives the record state message and stores transaction state data in memory that corresponds to the data grid node 617. The record state message can include the transaction state data. The transaction state data includes recovery information for all of the operations which are associated with a transaction. For example, the transaction state data includes the XID, the cache and key information for each transaction operation (e.g., write Owner Name operation and write Account Balance operation), the values for each operation, and an association between the XID and each operation. The recovery manager 619 receives the record state message and writes (664) the transaction state data in memory that corresponds to the data grid node 617.

The XA recovery logger 618 in the transaction originator node 617 sends (665A,B) a prepare message via network calls over the network to all of the enlisted nodes (e.g., Node 2 627, Node 3 637) to perform a prepare operation. The prepare message instructs the enlisted nodes to perform any operations for updating the request data (e.g., Owner Name, Account Balance) and to store the transaction state data in-memory. The prepare message can include the transaction state data for the XA transaction. An enlisted node performs the prepare operation in response to the request. For example, an enlisted node may acquire a lock for the changed value. For instance, Node 2 acquires a lock for changing the Owner Name data to Jane Doe, and Node 3 acquires a lock for changing the Account Balance data to "$0". After an enlisted node has acquired a lock for an operation, the XA transaction state data module 628,638 in a respective enlisted node sends (667A,B) a record state message to a corresponding recovery manager 629,639. A recovery manager 629,639 receives a record state message and writes (669A,B) the transaction state data in memory that corresponds to the data grid node.

Each recovery manager 629,639 writes the transaction state data pertaining to the all of the operations for the XA transaction For example, Node 2 627 owns Owner Name data, but the recovery manager 629 writes the transaction state data for both Owner Name data and Account Balance data to the in-memory container that is coupled to Node 2 627. In another example, Node 3 637 owns Account Balance data, but the recovery manager 639 writes the transaction state data for both Owner Name data and Account Balance data to the in-memory container that is coupled to Node 3 637. Thus, the transaction state data for the XA transaction is stored redundantly.

Each enlisted node can send (671A,B) a status response to the XA transaction state data module 618 in the transaction originator node 617 indicating whether or not the transaction state data has been successfully stored in-memory. If the XA recovery logger 618 in the transaction originator node 617 receives a failed response from one of the enlisted data grid nodes, the transaction originator node 617 can subsequently send an operation request to the nodes that attempted to prepare operations to now rollback the operations relating to the transaction identifier to a previous state. If the XA transaction state data module 618 in the transaction originator node 617 receives successful status responses from each of the enlisted data grid nodes, the XA recovery logger 618 can create and send (673) a ready to prepare message. The XA recovery logger 618 in the transaction originator node 617 keeps tracks of the response messages it receives from the various enlisted nodes (e.g., 627,637).

The XA recovery logger 618 in the transaction originator node 617 sends (673) a ready to prepare message to the transaction manager 613 via the client 615. The client 615 receives the ready to prepare message and formats the ready to prepare message in the proper protocol and sends (675) the formatted ready to prepare message to the transaction manager 613. The transaction manager 613 is notified via the ready to prepare message that if the transaction originator node 617 subsequently fails, the transaction state data for the particular XA transaction can be recovered from another data node (e.g., Node 2 627, Node 3 637). Likewise, if any of the enlisted data grid nodes fails, the transaction state data for the particular XA transaction can be recovered from the other data nodes (e.g., Node 2 627 or Node 3 637) or the transaction originator node 617. The transaction state data is not recoverable when the transaction originator node and all enlisted nodes fail.

The transaction manager 613 sends (677) a commit message to transaction originator node 617 via the client 615 to initiate the second phase (e.g., commit phase) of the two-phase commit protocol. A commit operation applies the changes relating to the transaction data such that the change can be read for other subsequent transactions. The commit message specifies the operations that are associated with XA transaction. The client 615 receives the commit message and formats a commit message in the proper protocol (e.g., Hot Rod) and sends (679) the formatted commit message to the transaction originator node 617. The transaction originator node 617 sends (681A,B) a commit request to the enlisted data grid nodes to make the set of changes made by an enlisted data grid node for the specific XA transaction permanent.

Figure 7:
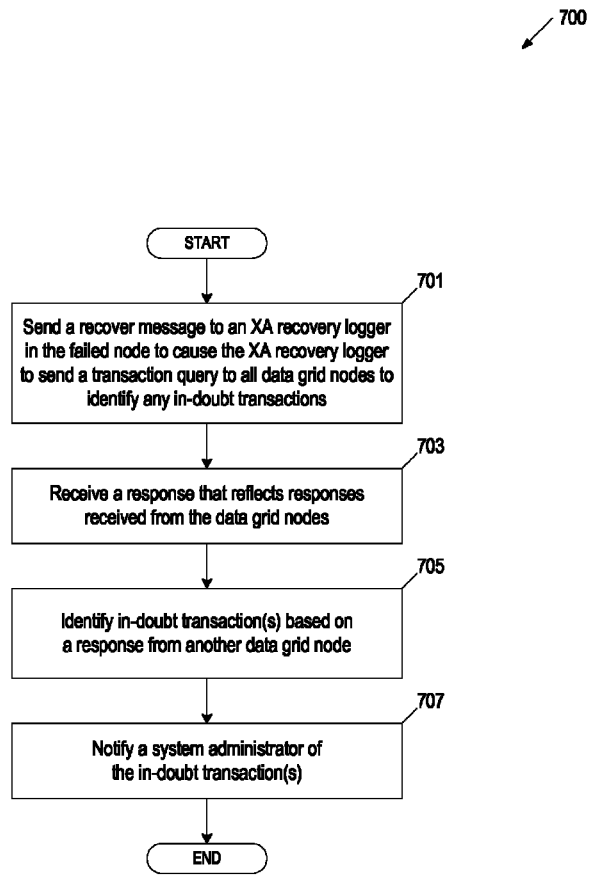
FIG. 7 is a flow diagram of an embodiment of a method for recovering disk-free transaction state data for an XA transaction using an in-memory data grid.
Figure 8:
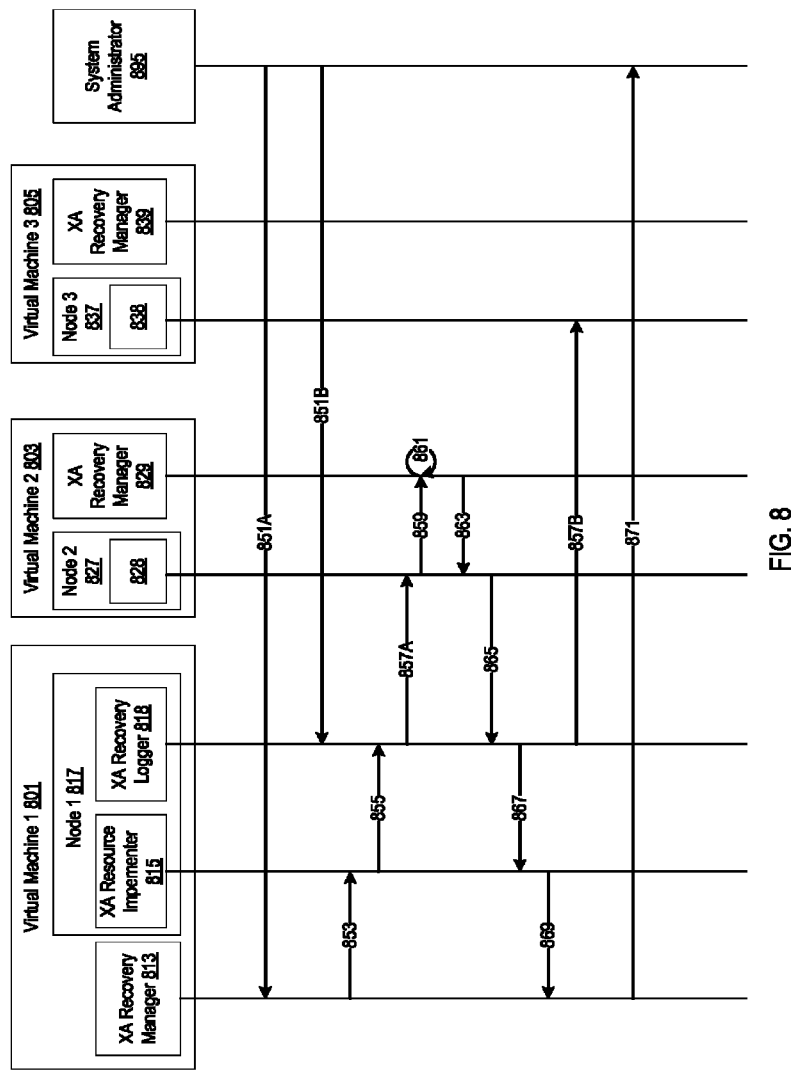
FIG. 8 is a block diagram of one embodiment of virtual machines communicating to recover transaction state data from in-memory data grids.

FIG. 7 is a flow diagram of an embodiment of a method 700 for recovering disk-free transaction state data for an XA transaction using an in-memory data grid. Method 700 can be performed by processing logic that can comprise hardware (e.g., circuitry, dedicated logic, programmable logic, microcode, etc.), software (e.g., instructions run on a processing device), or a combination thereof. In one embodiment, method 700 is performed by an XA recovery manager 147 of a data grid node 125A-C hosted by a machine 103,105,110 of FIG. 1 that has failed. An operating system of the failed node is restarted in response to a failure. For example, a system administrator process may trigger the operating system to restart. At block 701, processing logic sends a recover message to an XA recovery logger in the failed node to cause the XA recovery logger to send a transaction query to all of the data grid nodes in the cluster to identify in-doubt transactions. At block 703, processing logic receives a response from the XA recovery logger that reflects responses received from the data grid nodes in the cluster. At block 705, processing logic identifies an in-doubt transaction based on the responses from the other data grid nodes. Processing logic compares the responses receive from the data grid with a transaction manager log that is coupled to the recovery manager and determines which transaction(s) are in doubt and could use recovery. One embodiment of determining whether there is an in-doubt transaction is described in greater detail below in conjunction with FIG. 8. At block 707 processing logic notifies a system administrator of the in-doubt transaction(s). Processing logic can store transaction state data in local memory based on the transaction state data that is stored in the local memory of the other data grid node FIG. 8 is a block diagram of one embodiment of virtual machines communicating to recover transaction state data from in-memory data grids. A first virtual machine 801 can include a recovery manager 813, a data grid node 817, an XA resource implementer 815, and an XA recovery logger 819. As described above, an application, a transaction manager 813, and a client 815 may be included in a different virtual machine than a data grid node 817 and a recovery manager 819. A second virtual machine 803 can include a data grid node 827. A third virtual machine 805 can include a data grid node 837. Each data grid node 817,827,837 includes an XA transaction state data module 818,828,838 and a recovery manager 819,829,839 that is co-located in the same operating system process as the respective data grid node. A system administrator process 895 can be running in a virtual machine in the data grid.

A node pertaining to an XA transaction, such as a transaction originator node and/or an enlisted node, may fail. In this example, the transaction originator node 817 fails after returning a ready to commit message to a transaction manager. A node may fail, for example, due to a disk failure or a process crash. A system administrator process 895 for the data grid is notified and restarts 851A,B the XA recovery manager 813 in the failed node (e.g., transaction originator node 817). A system administrator process 895 can be a process running in a virtual machine in the data grid. A failed data grid node can retain the node state data that corresponds to the node in its local memory, but does not retain information pertaining to any XA transactions which the failed node was involved with prior to the point of failure.

When the XA recovery manager 813 reboots, it sends (853) a recover message to the failed node 817 via the XA resource implementer 815 to determine whether the failed node has information of any in-doubt transactions. An in-doubt transaction is an XA transaction that was prepared, but not committed or rolled back. The XA resource implementer 815 receives the recover message from the XA recovery manager 813, formats the recover message into an appropriate protocol (e.g., Hot Rod), and sends (855) the formatted recover message to the XA recovery logger 818. The XA recovery logger 818 sends 857A,B a broadcast message to query all of the data grid nodes in the cluster associated with the failed node 817, such as Node 2 827 and Node 3 837, to determine whether any node has information of an in-doubt transaction. The messages 857A and 875B can be broadcast in parallel.

The XA recovery logger 828,838 in a respective data grid node in the cluster can send a message to its corresponding recovery manager 829,839 to check the local in-memory for any information pertaining to an in-doubt transaction. A recovery manager 829,839 may locate an in-doubt transaction in the local memory of the data grid node and can provide the XID of the in-doubt transaction to the corresponding XA XA recovery logger 818 828,838. For example, the XA XA recovery logger 818 828 in Node 2 827 receives the broadcast message and sends (859) a message to its recovery manager 829 to check the local memory of the node for an in-doubt transaction. The recovery manager 829 identifies (861) the an in-doubt transaction in-memory and provides (863) the XID to the XA transaction state data module 828. The XA recovery logger 828 in Node 2 827 sends (865) a response that includes the XID of the in-doubt transaction to the XA recovery logger 818 in the failed transaction originator node 817. The XA recovery logger 818 provides (867) the XID to the XA resource implementer 815, which formats a response that includes the XID and sends (869) the response to the recovery manager 813.

The recovery manager 813 compares the response(s) that are received from the nodes in the data grid with the transaction manager log and determines which transactions are in-doubt and can use recovery. The recovery manager 813 sends (871) a message that includes the XID of the in-doubt transaction to the system administrator process 895. The system administrator process 895 determines how to handle the in-doubt transaction. One embodiment of the system administrator process determining how to handle the in-doubt transaction is described in greater detail below in conjunction with FIG. 9. The system administrator process 895 can decide whether to apply the state of the transaction (e.g., commit) or to delete the transaction (e.g., rollback). The system administrator process 895 can use multiple JMX (Java Management Extension) tooling operations to handle the in-doubt transaction.

The recovery manager 813 can send a forget call that includes the XID to the transaction originator node 817. The forget call notifies the transaction originator node 817 that the transaction manager 813 is aware of the XID is for in-doubt transaction. In response to the forget call, the transaction originator node 817 can send a message to the enlisted nodes to no longer mark the XID as an in-doubt transaction. Subsequently, when a node is queried for in-doubt transactions, the node does not provide the particular XID.

Figure 9:
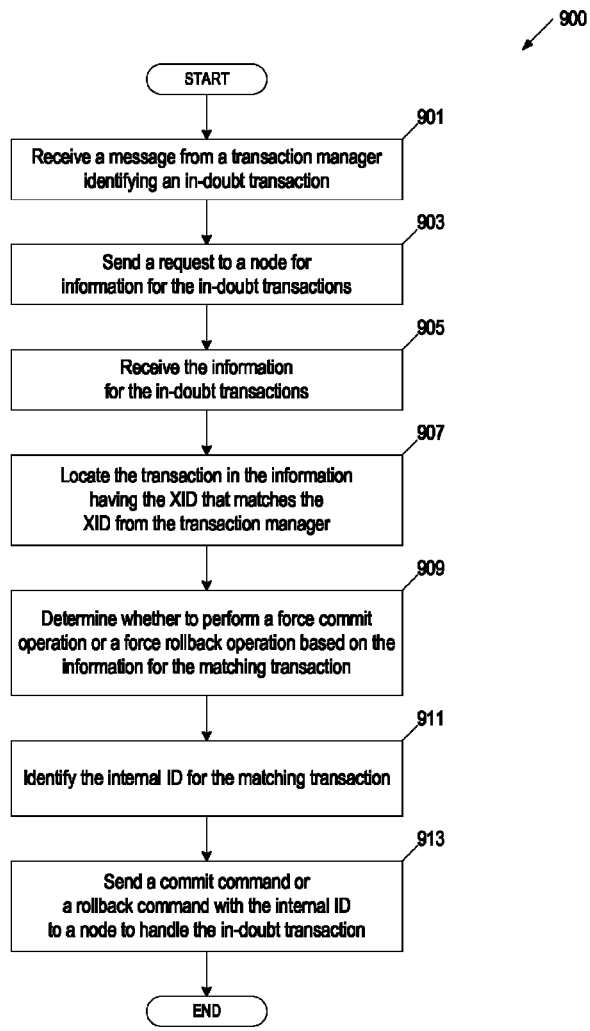
FIG. 9 is a flow diagram of an embodiment of a method for handling an in-doubt transaction using transaction state data from an in-memory data grid.

FIG. 9 is a flow diagram of an embodiment of a method 900 for handling an in-doubt transaction using transaction state data from an in-memory data grid. Method 900 can be performed by processing logic that can comprise hardware (e.g., circuitry, dedicated logic, programmable logic, microcode, etc.), software (e.g., instructions run on a processing device), or a combination thereof. In one embodiment, method 900 is performed by a system administrator process 149 hosted by a machine 103,105,110,115 of FIG. 1.

At block 901, processing logic receives a message from a transaction manager that includes the XID of an in-doubt transaction of interest. The message is a request for processing logic to handle the state of the in-doubt transaction. For example, processing logic can use the XID to determine whether to force a commit or to force a rollback of the state of the in-doubt transaction. A rollback command instructs the data grid nodes to cause any operation that was performed for a particular transaction to be returned to a previous state. A commit command instructs the data grid nodes to apply the change to allow other transactions that will read the data to read the changed data.

At block 903, processing logic sends a request to any node in the cluster for information for the in-doubt transactions. The recovery manager in the node provides the information of the in-doubt transactions. For example, Node 1 is a transaction originator node and Node 2 and Node 3 are enlisted nodes. Node 4 is not an enlisted node, but is in the cluster of nodes as Node 1, Node 2, and Node 3. Node 1 fails and processing logic sends a request to Node 4 for the information for the in-doubt transactions. Node 4 receives the request and requests the information of the in-doubt transactions from Node 2 and Node 3. Node 4 receives and provides the information to the system administrator process.

At block 905, processing logic receives the information for the in-doubt transactions from the node. The information can be a list of the in-doubt transactions that includes the XID as generated by a transaction manager, an internal ID as generated by a recovery manager, and a status, for each in-doubt transaction in the list. The list is a map of the XID to the internal ID for each in-doubt transaction. The status can be a string describing the state of the transaction. For example, the status can be 'prepared' to indicate that the transaction is prepared on all nodes, but is a commit request has not been received. In another example, the status is 'heuristically committed' to indicate the transaction was committed on a subset of nodes, but not all of the nodes.

At block 907, processing logic locates the transaction having the XID that matches the XID received from the transaction manager in the information (e.g., list). At block 909, processing logic determines whether to perform a force commit operation or a force rollback operation based on the status of the matching in-doubt transaction. For example, if the status is 'prepared,' processing logic may force a commit. If the status is 'heuristically prepared,' processing logic may force a rollback. At block 911, processing logic identifies the internal ID that corresponds to the XID in the list and sends a command (e.g., commit command, rollback command) that includes the internal ID to any node in the cluster in the data grid to handle the in-doubt transaction at block 913. The node can relay the command to the appropriate nodes in the cluster to perform the operations (e.g., commit, rollback).

Figure 10:
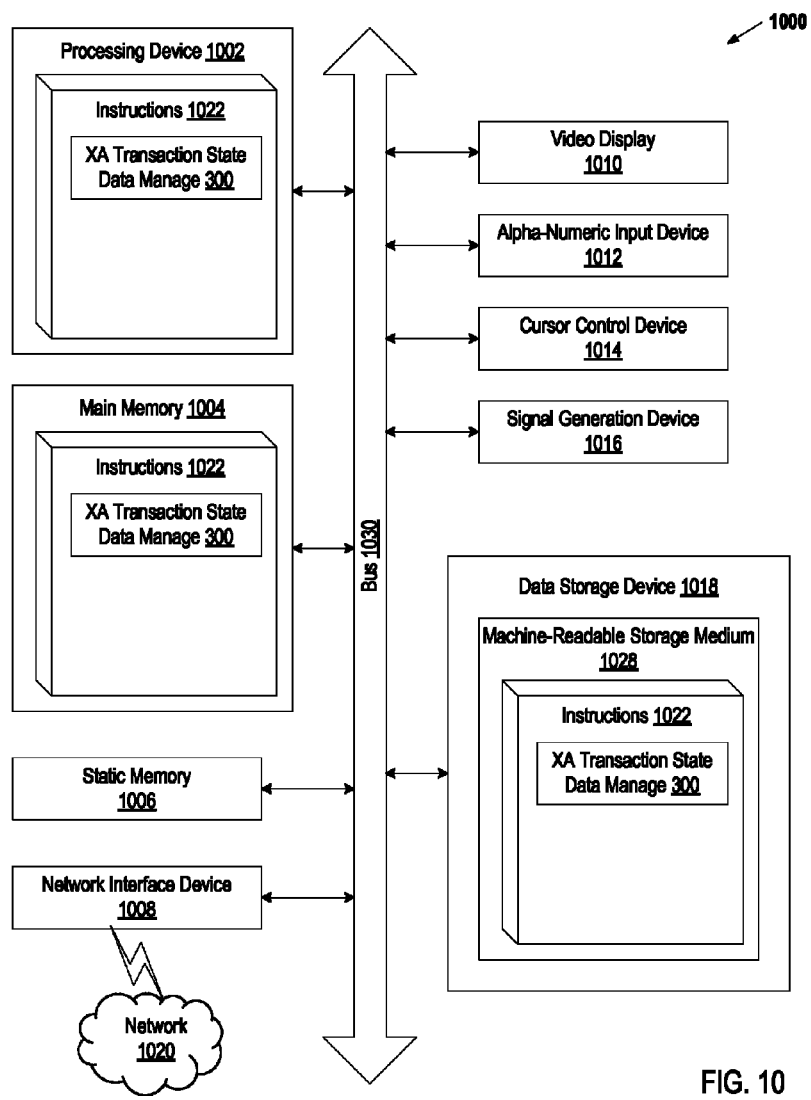
FIG. 10 is a diagram of one embodiment of a computer system for recovering disk-free transaction state data for an XA transaction using an in-memory data grid.

FIG. 10 illustrates a representation of a machine in the exemplary form of a computer system 1000 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The exemplary computer system 1000 includes a processing device 1002, a main memory 1004 (e.g., read-only memory (ROM), flash memory, dynamic random access memory (DRAM) such as synchronous DRAM (SDRAM) or DRAM (RDRAM), etc.), a static memory 1006 (e.g., flash memory, static random access memory (SRAM), etc.), and a data storage device 1018, which communicate with each other via a bus 1030.

Processing device 1002 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 is configured to execute instructions 1022 for performing the operations and steps discussed herein.

The computer system 1000 may further include a network interface device 1008. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1016 (e.g., a speaker).

The data storage device 1018 may include a machine-readable storage medium 1028 (also known as a computer-readable medium) on which is stored one or more sets of instructions or software 1022 embodying any one or more of the methodologies or functions described herein. The instructions 1022 may also reside, completely or at least partially, within the main memory 1004 and/or within the processing device 1002 during execution thereof by the computer system 1000, the main memory 1004 and the processing device 1002 also constituting machine-readable storage media.

In one embodiment, the instructions 1022 include instructions for an XA transaction state data module (e.g., XA transaction state data module 300 of FIG. 3) and/or a software library containing methods that call a data grid node and/or a proxy server. While the machine-readable storage medium 1028 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving" or "storing" or "identifying" or "sending" or "generating" or "restarting" or "providing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present invention also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing information in a form read-able by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A method to perform the following comprising:
   receiving, by a first data grid node hosted by a computer system in a data grid, a request to prepare transaction operations for a multi-operational transaction for a commit, wherein the transaction operations are associated with one or more other data grid nodes in the data grid;
   storing transaction state data for the multi-operational transaction in local memory associated with the first data grid node;
   identifying the one or more other data grid nodes managing data pertaining to the transaction operations for the multi-operational transaction; and
   sending the transaction state data to the one or more other data grid nodes, wherein each of the other data grid nodes stores the transaction state data in local memory associated with the corresponding data grid node.

2. The method of claim 1, further comprising:
   receiving a response from each of the other data grid nodes that the transaction state data is stored in local memory associated with the corresponding data grid node; and
   sending an acknowledgment message to a transaction manager that the transaction operations for the multi-operational transaction are prepared for the commit.

3. The method of claim 1, wherein the transaction state data comprises a key-value pair for each operation for the multi-operational transaction, a transaction identifier for the multi-operational transaction, and an association between the transaction identifier and the operations.

4. The method of claim 1, further comprising:
   generating an internal identifier for a transaction identifier that is created by a transaction manager, wherein the internal identifier is used to send at least one of a commit request or a rollback request to a data grid node.

5. A method to perform the following comprising:
   restarting, by a first data grid node hosted by a computer system in a data grid, an operating system of the first data grid node in response to a failure related to the first data grid node;
   sending a transaction query to one or more other data grid nodes to identify a prepared and incomplete multi-operational transaction in response to receiving a recover message, wherein at least one of the other data grid nodes stores transaction state data of multi-operational transaction in local memory; and
   identifying a prepared and incomplete multi-operational transaction based on a query response received from at least one of the other data grid nodes, wherein the transaction state data for the prepared and incomplete multi-operational transaction is stored in local memory of the at least one other data grid node.

6. The method of claim 5, further comprising:
   providing a transaction identifier of the identified prepared and incomplete multi-operational transaction to the transaction manger.

7. The method of claim 5, further comprising:
   storing, by the first data grid node, transaction state data in local memory associated with the first data grid node using the transaction state data for the prepared and incomplete multi-operational transaction that is stored in the local memory of the at least one other data grid node.

8. A system comprising:
   a first local memory to store transaction state data for a multi-operational transaction; and
   a first processing device coupled to the first memory configured to
   receive a request to prepare transaction operations for the multi-operational transaction for a commit, wherein the transaction operations are associated with one or more other data grid nodes in a data grid;

identify the one or more other data grid nodes managing data pertaining to the transaction operations for the multi-operational transaction; and send the transaction state data to the one or more other data grid nodes, wherein each of the other data grid nodes stores the transaction state data in local memory associated with the corresponding data grid node.

9. The system of claim 8, wherein the first processing device is configured to:

receive a response from each of the other data grid nodes that the transaction state data is stored in local memory associated with the corresponding data grid node; and send an acknowledgment message to a transaction manager that the transaction operations for the multi-operational transaction are prepared for the commit.

10. The system of claim 8, wherein the transaction state data comprises a key-value pair for each operation for the multi-operational transaction, a transaction identifier for the multi-operational transaction, and an association between the transaction identifier and the operations.

11. The system of claim 8, wherein the processing device is further configured to:

generate an internal identifier for a transaction identifier that is created by a transaction manager, wherein the internal identifier is used to send at least one of a commit request or a rollback request to a data grid node.

12. The system of claim 8, wherein the processing device is further configured to:

restart an operating system in response to a failure;

send a transaction query to one or more other data grid nodes to identify a prepared and incomplete multi-operational transaction in response to receiving a recover message, wherein at least one of the other data grid nodes stores transaction state data of multi-operational transaction in local memory; and identify a prepared and incomplete multi-operational transaction based on a query response received from at least one of the other data grid nodes, wherein the transaction state data for the prepared and incomplete multi-operational transaction is stored in local memory of the at least one other data grid node.

13. The system of claim 12, wherein the processing device is further configured to:

provide a transaction identifier of the identified prepared and incomplete multi-operational transaction to the transaction manger.

14. The system of claim 12, wherein the processing device is further configured to:

store transaction state data in the first local memory using the transaction state data for the prepared and incomplete multi-operational transaction that is stored in the local memory of the at least one other data grid node.

15. A non-transitory computer-readable storage medium including instructions that, when executed by a computer system in a data grid, cause the computer system to perform a set of operations comprising:

receiving, by a first data grid node hosted by the computer system, a request to prepare transaction operations for a multi-operational transaction for a commit, wherein the transaction operations are associated with one or more other data grid nodes in the data grid;

storing transaction state data for the multi-operational transaction in local memory associated with the first data grid node;

identifying the one or more other data grid nodes managing data pertaining to the transaction operations for the multi-operational transaction; and sending the transaction state data to the one or more other data grid nodes, wherein each of the other data grid nodes stores the transaction state data in local memory associated with the corresponding data grid node.

16. The non-transitory computer-readable storage medium of claim 15, further comprising:

receiving a response from each of the other data grid nodes that the transaction state data is stored in local memory associated with the corresponding data grid node; and sending an acknowledgment message to a transaction manager that the transaction operations for the multi-operational transaction are prepared for the commit.

17. The non-transitory computer-readable storage medium of claim 15, wherein the transaction state data comprises a key-value pair for each operation for the multi-operational transaction, a transaction identifier for the multi-operational transaction, and an association between the transaction identifier and the operations.

18. The non-transitory computer-readable storage medium of claim 15, further comprising:

generating an internal identifier for a transaction identifier that is created by a transaction manager, wherein the internal identifier is used to send at least one of a commit request or a rollback request to a data grid node.

19. The non-transitory computer-readable storage medium of claim 15, further comprising:

restarting an operating system in response to a failure;

sending a transaction query to one or more other data grid nodes to identify a prepared and incomplete multi-operational transaction in response to receiving a recover message, wherein at least one of the other data grid nodes stores transaction state data of multi-operational transaction in local memory; and identifying a prepared and incomplete multi-operational transaction based on a query response received from at least one of the other data grid nodes, wherein the transaction state data for the prepared and incomplete multi-operational transaction is stored in local memory of the at least one other data grid node.

20. The non-transitory computer-readable storage medium of claim 15, further comprising:

storing transaction state data in local memory associated with the first data grid node using the transaction state data for the prepared and incomplete multi-operational transaction that is stored in the local memory of the at least one other data grid node.

* * * * *

UNITED STATES PATENT AND TRADEMARK OFFICE
CERTIFICATE OF CORRECTION

PATENT NO.        : 8,738,964 B2
APPLICATION NO.   : 13/324196
DATED             : May 27, 2014
INVENTOR(S)       : Mircea Markus Page 1 of 1

It is certified that error appears in the above-identified patent and that said Letters Patent is hereby corrected as shown below:

Claims:

In claim 6, column 18, line 51 delete "manger" and insert --manager--

In claim 13, column 19, line 46 delete "manger" and insert --manager--

Signed and Sealed this
Ninth Day of August, 2016

Michelle K. Lee
*Director of the United States Patent and Trademark Office*